L. L. SCOTT.

CLOTH MEASURING MACHINE.

APPLICATION FILED SEPT. 13, 1919.

Reissued June 22, 1920. 14,898.

INVENTOR

Lum L. Scott

UNITED STATES PATENT OFFICE.

LEWIS L. SCOTT, OF ST. LOUIS, MISSOURI, ASSIGNOR, BY MESNE ASSIGNMENTS, TO THE MEASUREGRAPH COMPANY, A CORPORATION OF MISSOURI.

CLOTH-MEASURING MACHINE.

14,898. Specification of Reissued Letters Patent. Reissued June 22, 1920.

Original No. 1,303,971, dated May 20, 1919, Serial No. 145,145, filed January 29, 1917. Application for reissue filed September 13, 1919. Serial No. 323,636.

*To all whom it may concern:*

Be it known that I, LEWIS L. SCOTT, a citizen of the United States of America, residing at the city of St. Louis, State of Missouri, United States of America, have invented a certain new and useful Cloth-Measuring Machine, of which the following is such a full, clear, and exact description as will enable any one skilled in the art to which it appertains to make and use the same, reference being had to the accompanying drawings, forming part of this specification.

My invention relates to improvements in cloth measuring machines, and more particularly to that class of machines, in which the cloth is passed between a pair of rollers, one of which is connected to a registering device and also to a computing chart for indicating the computed prices of the lengths of goods measured.

One object of my invention is to provide a simple, compact, light and inexpensive device of the class above referred to. Another object of my invention is to provide means for disconnecting the computing chart from the remaining parts of the machine, so that the machine may be used for continuous measurement, as, for instance, in taking inventory.

Another object of my invention is to arrange the computed prices on the computing chart in such a manner that a great quantity of computed prices can be put on a single chart of relatively short width. In practice it is very desirable to have a price range of some forty-eight or even more different prices per yard.

A further object of my invention is to so construct the measuring roller that accurate and reliable measurements can be gotten. A further object is to provide an automatic means for returning the measuring roller and connected parts to initial position, and to further provide an automatic governor or brake (located at a point where maximum speed is obtained) to prevent excessive speed of the parts in returning to initial position.

Another object of my invention is to so mount the machine that it may be used both vertically and horizontally, in order to facilitate its use in retail drygoods stores where goods are frequently piled up on the counter where the machine is used.

Figure 1:
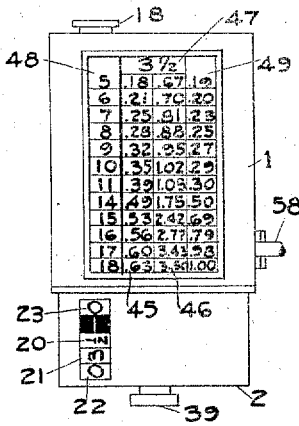
Figure 2:
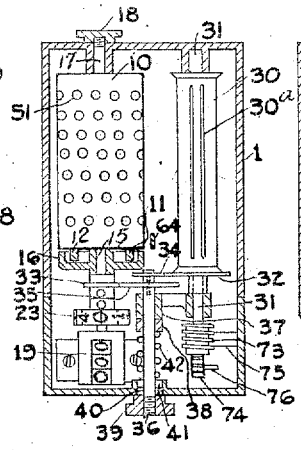
Figure 3:
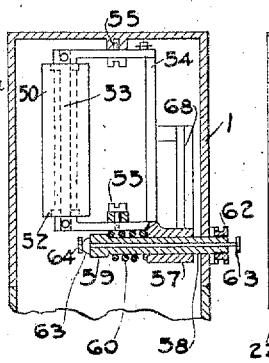
Figure 4:
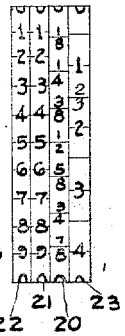
Figure 5:
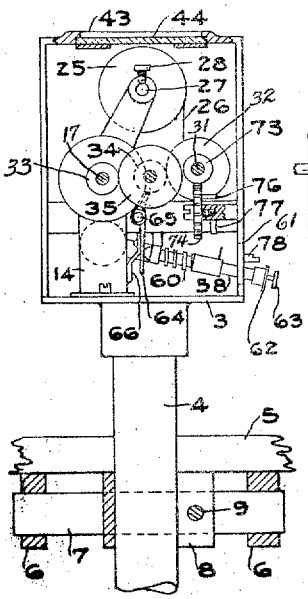
Figure 6:
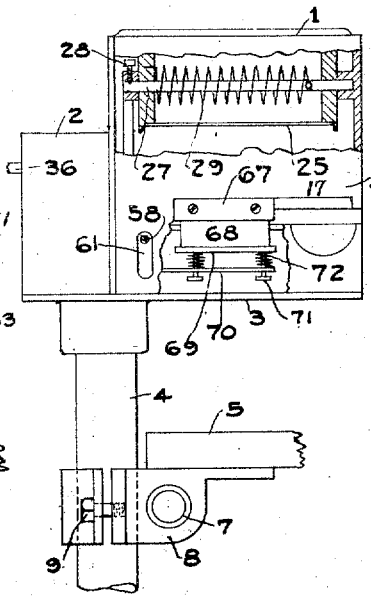
Figure 7:
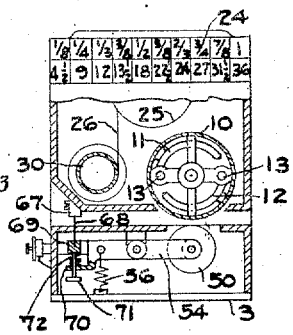
Figure 8:
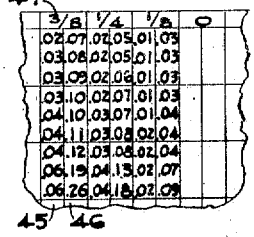

In the accompanying drawings, which illustrate one form of device made in accordance with my invention, Figure 1 is a top plan view; Fig. 2 is a horizontal section; Fig. 3 is a horizontal cross-section through a portion of the machine showing a detail of operating mechanism for the clamping roll; Fig. 4 is a development of the surface of the measuring wheel; Fig. 5 is a vertical cross-section; Fig. 6 is a side view, some of the parts being shown in section; Fig. 7 is an end view, showing a part of the front wall of case 1 removed so that some of the interior parts may be seen; and Fig. 8 is a view showing a portion of the computing chart.

Like marks of reference refer to similar parts in the several views of the drawings.

1 represents a case which serves to inclose and form a support for the interior working parts. 2 Fig. 6 is a back cover attached to 1 by screws (not shown). 3 is a base plate which is attached to case 1 and cover 2, and is provided with the arm 4 which extends downward. 5 is a store counter to which is attached the brackets 6 which support the round bar 7 at each end. The casting 8 is bored horizontally to fit the bar 7, and vertically to fit the arm 4. 9 is a clamp screw to clamp the arm 4. It will be noted that this arrangement permits the measuring machine to be moved both vertically and horizontally. In displaying and showing goods on the store counter, said goods get piled up so that in order to use the machine to advantage it is necessary to raise it to the level of the pile of goods. It is also desirable to slide the machine along the store counter so that more than one clerk can have access to it. 10 is a measuring roller which is exactly one-eighth of a yard in circumference. 11 and 12 are governor weights which are pivoted to the roller 10 at 13. The casting 14 (Fig. 5) carries the measuring roller bearing 15 (Fig. 2) and has an enlarged recessed bore 16 in which the governor weights 11 and 12 run. 17 is the measuring roller shaft. 18 is a button attached to the front end of shaft 17, which may be used to rotate the roller 10—to return the register to zero. 19 is the counting indicator arranged to count 99⅞ and then start again at zero. 20 is a wheel on the counter arranged to count or indicate ⅛ yard at each revolution of the roller 10, said wheel 20 is geared to ⅛ speed of shaft 17. Wheel 21 is geared $\frac{1}{10}$ of wheel 20 and wheel 22, $\frac{1}{10}$ of wheel 21 (gearing not shown). Wheel 23 is directly connected to shaft 17 and is divided into nine equal spaces (40° apart) which indicate ½ inch each, making a total of 4½ inches for the ⅛ yard. Measurements most commonly used in the sale of cloth are in yards and fractions of yards in steps of eighths. It is some times desirable to measure ⅓s and ⅔s also an odd number of inches. A reading of ⅓ or ⅔ of a yard may be gotten in the following way: By referring to table 24 (Fig. 7) which gives fractions of a yard in ⅛s, also ⅓s, and ⅔s and below each fraction its equivalent in inches—it will be noted that ⅓ of a yard equals 12 inches, or 3 inches more than ¼ yard and comes between ¼ and ⅜. To read ⅓ yard, wheel 20 should indicate ¼ yard and wheel 23, 3 inches. To read ⅔ (which is 24 inches or 1½ inches more than ⅝ yards) wheel 20 should indicate ⅝ yards and wheel 23, 1½ inches. By this arrangement a reading can be had in inches, fractions of ⅛ or ⅓ and a continuous measurement can be gotten of an indefinite number of yards. The wheel 23 being directly attached to the shaft 17 without gearing of any kind, there is no possible chance for any wear taking place to affect the accuracy of measurement.

The numeral 25 (Figs. 5, 6, and 7) indicates a roller on which the computing chart is wound up, very much the same as the common window curtain. Roller 25 is provided with bearings which run on the stationary shaft 27, which is locked against rotation by the set screws 28. The spiral spring 29 (Fig. 6) is wound around the shaft 27, and one end of said spring is fastened to shaft 27 and the other end fastened to roller 25. One end of the chart 26 is secured to a roller 30 (Fig. 2) by being passed through slots 30ª in said roller; said roller 30 is fixed to its shaft 31, which latter carries the spur gear 32 which connects the spur gear 33 (on measuring roller shaft 17) through spur gears 34 and 35 (gear teeth not shown). Gears 34 and 35 are locked together and have a bearing on one end of the shaft 36—said shaft 36 is supported by the bearing 37 and is provided with a stop collar 38. The other end of the shaft 36 projects through the back cover 2 and has the button 39 attached thereto. The pin 40 is fixed to the shaft 36 and normally rests in the slot 41 in back cover 2. The spring 42 fits over shaft 36, one end bearing against the inside of cover 2, and the other end against the collar 38. This spring 42 normally holds shaft 36 in the position shown in Fig. 2. By pulling out on the button 39 (so pin 40 is clear of slots 41) and turning a few degrees, the gears 34 and 35 will be disconnected from the other two gears to operate the register without operating the cost computing mechanism.

The case 1 is provided with a slot 43 (Fig. 5) which is directly over the chart roller 25; said opening 43 is covered by the glass window 44. Columns of figures 45 and 46 are arranged on the chart (see Figs. 1 and 8) which indicate the cost of given lengths of material at different prices per yard; the columns of numbers are in pairs of two and each pair has at its head, a number or a fractional number as indicated by 47, indicating the length of material to which prices in the corresponding column apply. Extending along either side of the slot 43 are the strips 48 and 49, having arranged thereon a series of numbers, indicating the price per yard. The said prices shown in Fig. 1 running from 5 cents to $1.00 and said numbers arranged to be directly opposite the number in the various columns 45 and 46, so that as the chart 26 is wound up on the roller 30 Fig. 7 (by the rotation of measuring roller 10) to a given position according to the length of material measured, the number at the head of the pair of columns 45 and 46 will indicate the length of material measured, and by observing the number in column 48 or 49, which indicates the price per yard at which the material is sold, the number on the chart 26 directly opposite and adjacent such price number will indicate the cost of the length of material measured. It will be noted that by arranging the numbers in double columns 45 and 46 and placing the price per yard on both sides of slot 43 a very wide range of prices per yard can be had in a small space, thereby making the machine very compact. To get the same quantity of price ranges (by other arrangements) that I am enabled to get with my arrangement, it would be necessary to either double the width of the computing chart or use two separate charts of the same length as used on my machine. Where two charts are used or where a chart of long length is used, added weight and friction is introduced which has been found in practice to materially impair the accuracy of the measurements.

The presser roller 50 is made of rubber and is designed to coöperate with the measuring roller 10 to maintain material placed between rollers in frictional contact with roller 10 so that the latter will be turned by drawing material between the rollers. Roller 10 is made of metal and has a series of small holes 51 drilled all along the periphery, these holes are so small that they cannot cause damage to the material. By so constructing rollers 10 and 50, I prevent slippage which would cause inaccurate measurement; and by having the measuring roll made of metal, instead of rubber, it is insured against changing size, and thereby causing inaccurate measurement. The roller 50 is provided with bearings 52 (Fig. 3) which run on the shaft 53; said shaft 53 is fixed to frame 54 which is provided with pivot bearings 55 secured to case 1. The springs 56 (Fig. 7) are for the purpose of holding the roller 50 in contact with roller 10. The frame 54 is provided with a lug 57 which is bored out to receive the shaft 58 which is slidably mounted therein. The shaft 58 has an enlarged end 59. The coil spring 60 is mounted on shaft 58 and bears against the lug 57 of frame 54. One end of the shaft 58 projects through the elongated slot 61 (Figs. 5 and 6) in case 1, and the button 62 is screwed on to said projecting end. Shaft 58 has a small hole running through its length in which the small push rod 63 (Fig. 3) is slidably mounted. 64 is a brake lever which is pivoted to case 1 at 65, Fig. 5. One end of said brake lever 64 is designed to bear against the roller 10 when roller 50 is not in contact with roller 10—in order to prevent accidental rotation of the roller. Spring 66 (Fig. 5) is attached to the lower end of the brake lever 64. 67 (Figs. 6 and 7) is a fiber block which is attached to case 1. 68 is a knife blade which fits in a small slot in bar 69, said bar 69 is yieldingly connected to the cross piece 70 of frame 54 by the screws 71 held in place by the coil springs 72. The action and purpose of these parts will be described later. The worm 73 (Fig. 2) is secured to the shaft 31 and works the worm wheel 74 (Fig. 5) which is provided with suitable bearings in the stand 75. The pin 76 is secured to the worm wheel 74—said pin abuts (when the worm wheel is in a certain position) against the stop 77 on the stand 75. The stop 77 prevents the worm wheel 74 from making a complete revolution in either direction, thus preventing injury to the mechanism through overrotation in either direction.

The operation of the device is as follows: To measure a certain length of goods the operator inserts the edge portion of the cloth between the rollers 10 and 50 and places the end of the cloth against the side of the knife blade 68, which is in the position shown in Fig. 7. The button 62 (Fig. 5.) is pulled outwardly so as to disengage it from the detent 78 of case 1; the springs 56 (Fig. 7) will act on frame 54 thereby moving the roller 50 upon the cloth and pressing it firmly into contact with roller 10; at the same time the knife 68 is moved downwardly out of the path of the cloth, and the spring 60 will cause the shaft 58 to move inwardly, so that the push rod 63 (Fig. 3) will engage the lower arm of the brake lever 64 and release it from the roller 10 (see Fig. 5). The material is then pulled between the rollers, and the movement of the goods will rotate the roller 10, which will in turn rotate the counting device, also the chart rollers and worm 73, through gears 35, 34 and 32 as before described. As the roller 25 is caused to revolve by movement of the chart 26, the spiral spring 29, (Fig. 6) will be put under tension. Assuming that the purchaser desires 3½ yards of cloth—the movement of the cloth between the rollers is continued until the wheel 21 indicates 3 and wheel 20 indicates ½ (see Fig. 1) when further movement of the cloth will be stopped. The button 62 is then pulled outwardly and upward until it engages the notch 78. This action separates the rollers, sets the brake 64 so as to prevent rotation of the roller 10, and brings the knife 68 in yielding contact with the goods, so as to hold the cloth up to the fiber block 67. By pulling the goods out from between the rollers the knife will cut a notch at the correct point. The operator then tears off the cloth, or cuts the same with scissors. Assuming the price of the cloth to be 79 cents per yard, the operator would then look for the cost price in the column head by "3½" lying opposite and adjacent 79 in column 49 which would show the cost of the material measured was $2.77. The cost of any amount of cloth from ⅛ up to 12 yards (which is usually the limit of retail sales) would be similarly ascertained.

After the machine has been used in the measuring operation the measuring indicator and chart may be returned to zero by simply pressing the push rod 63 which will release the brake lever 64 from the roller 10. The spiral spring 29 will then act on the roller 25, causing the rotating parts to revolve until the pin 76 on the worm wheel 74 will come into contact with the stop 77, which is set to stop the chart and counter indicator at zero. During the return to zero of all parts, roller 10 is revolved at high speed—the governor arms 11 and 12, by centrifugal force, will bear against the bore 16 (Fig. 2) in casting 14 and thereby act as a brake to prevent excessive speed of all parts in returning to zero.

The stop 77 (Fig. 5) will also prevent the worm wheel 74 from making a complete revolution when turned in the direction as in measuring. It is so arranged as to lock before the computing chart is entirely wound up on the roller 30, thereby preventing damage to said chart by careless operation. Where it is desired to use the machine for measuring only (such as is the case in taking inventory of goods) where the computing would not be needed, and where long lengths of goods are to be measured, the computing chart and rollers holding the same, are disconnected by pulling out 39 thus disconnecting gears 33 and 35. This will allow continuous rotation of the measuring roller 10 and counting indicators. Suppose that the length of the first piece of cloth measured was 50 yards, by making a notation of the counting indicator reading, the next piece will be measured with 50 yards on the indicator as the starting point. This simply means that if this feature of disconnecting the computing chart did not exist it would either be necessary to have a computing chart ten times longer than necessary for retail sale of goods; or the machine would have to be reset to zero every 12 yards in measuring a bolt of goods containing 60 yards. The resetting would cause a loss of time and a chance to miscount. When it is again desired to connect up the computing chart rollers, so as to operate when measuring roller 10 is revolved, it can be done by pushing in 39 to mesh gear 35 and 33. It will, however, be necessary to set the counting indicator to zero by turning on the button 18 (Fig. 2).

Having fully described my invention, what I claim as new and desire to secure by Letters Patent of the United States is:

1. In a measuring and computing machine the combination with a measuring roller, of a computing chart, means whereby said chart is operated from said roller, said chart having a series of computed prices for each fractional measurement, a spring for returning the chart and measuring roller to initial position, means for stopping said parts at the zero or initial position, and retarding means including a centrifugal friction brake device, attached to the measuring roller, for regulating the speed of the return movement of said roller and connected parts.

2. In a measuring and computing machine, a measuring roller made of rigid material and provided with holes, a computing chart, means whereby said chart is operated from said roller, a second roller made of resilient material and coöperating with the measuring roller to hold said goods to be measured firmly against said measuring roller and yielding means for holding said second roller against said measuring roller.

3. In a measuring and computing machine, the combination with a measuring roller, of a computing chart, means whereby said chart is operated from said roller, said chart having a series of computed prices for each fractional measurement and having said fractional measurements printed on said chart, a casing for said parts and having an opening therein through which a portion of said chart is visible, there being a series of prices, per single yard on the casing, and an inch registering wheel directly connected with said measuring roller, said inch registering wheel coöperating with the yardage indicated by said chart.

4. In a measuring and computing machine, the combination with a measuring roller, of a computing chart, means whereby said chart is operated from said roller, said chart having a series of computed prices for each fractional measurement arranged in two adjacent rows and having said fractional measurements printed on said chart for each double row of computed prices, a casing carrying said parts, and having an opening therein through which a portion of the chart is visible, there being a series of prices per single yard on the casing and arranged in two rows, one on each side of the opening, each row cooperating with one of the rows of computing prices on the chart, and an inch registering wheel, directly connected with the measuring roller, said inch registering wheel coöperating with the yardage indicated by the said chart.

5. In a cloth measuring machine, the combination with a measuring roller, of a second roller coöperating therewith, a movable frame carrying said second roller, a cloth cutting knife yieldingly carried by said frame, and means for moving said frame to bring said knife into operative position and separate said rollers, whereby said cloth is slit when it is removed from the machine.

6. In a cloth measuring machine, the combination with a measuring roller, of a registering device actuated therefrom, a brake for preventing said registering device from returning to initial position, a cutting knife, means for simultaneously operating said cutting knife and setting said brake, and manually operated means for releasing said brake.

7. In a cloth measuring machine, the combination with a measuring roller, of a second roller coöperating therewith, a registering device actuated from said first named roller, a brake for preventing the return of said measuring roller and registering device to initial position, means for simultaneously disconnecting said rollers and setting said brake, and manually operated means for releasing said brake.

8. In a cloth measuring machine, the combination with a measuring roller, of a second roller coöperating therewith, means for moving said second roller toward and away from said first named roller, a cutting knife operatively connected to said second named roller, a spring actuated brake mechanism for said measuring roller, means for simultaneously separating said rollers and setting said knife, and means for operating said brake mechanism.

9. In a cloth measuring machine, the combination with a measuring roller, of a registering device operated therefrom, a cloth cutting knife, a brake for preventing the return of said roller to initial position, means for simultaneously moving said knife into operative position and setting said brake and manually operated means for releasing said brake.

10. In a cloth measuring machine, the combination with a measuring roller, of a registering device operated therefrom, a second roller coöperating therewith, a movable frame carrying said second roller, a cloth cutting knife carried by said frame, a brake for preventing the return of said measuring roller to initial position, means for simultaneously actuating said frame to separate said rollers, move said knife into operative position, and set said brake, and manually operated means for releasing said brake.

11. In a cloth measuring machine, the combination with a measuring roller, of a registering device, a computing chart, means operated by said measuring roller for operating both the said registering device and the computing chart, and means for disconnecting said measuring roller and chart while said measuring roller is in operative connection with said registering device whereby the machine may be used for measurement only.

12. In a cloth measuring machine, the combination with a measuring roller, of a registering device, a computing chart, means operated by said measuring roller for operating both the said registering device and the computing chart, means for disconnecting said measuring roller and chart while said measuring roller is in operative connection with said registering device, whereby the machine may be used for measurement only, and means for manually returning said registering device to initial position.

13. In a cloth measuring machine, the combination with a measuring roller, of a registering device, a computing chart, means actuated by said measuring roller for operating both said registering device and computing chart, a spring for returning said parts to initial position, and means for disconnecting said computing chart and spring from said measuring roller, whereby the machine may be used for measurement only.

In testimony whereof, I have hereunto set my hand.

LEWIS L. SCOTT.